United States Patent Office 3,555,651
Patented Jan. 19, 1971

3,555,651
APPARATUS FOR PRODUCING THE STATOR OF A DC MINIATURE MOTOR
Hans-Peter Latussek and Werner Dittrich, Nuremberg, Germany, assignors to Siemens Aktiengesellschaft, a corporation of Germany
Original application July 5, 1966, Ser. No. 562,755, now Patent No. 3,413,715, dated Dec. 3, 1968. Divided and this application May 24, 1968, Ser. No. 739,971
Claims priority, application Germany, July 13, 1965, S 98,153
Int. Cl. B21d 26/14; H02k 15/00
U.S. Cl. 29—205                                     6 Claims

ABSTRACT OF THE DISCLOSURE

Apparatus for producing the stator of a miniature motor comprises an assembly mandrel. A centering ring is coaxially positioned around the stem of the mandrel and supported on the centering rim of the mandrel. An annular stator magnet is coaxially positioned around the stem of the mandrel. The stator magnet is supported on the mandrel in spaced relation from the centering ring by a lateral support affixed to the mandrel. A bearing plate having a bearing mounted therein is coaxially positioned at the end of the stem of the mandrel opposite the end of the centering rim. A tubular housing is coaxially positioned around the ring, the magnet and the plate, and is crimped between and around each of the ring, the magnet and the plate to hold them in position.

Figure 1:
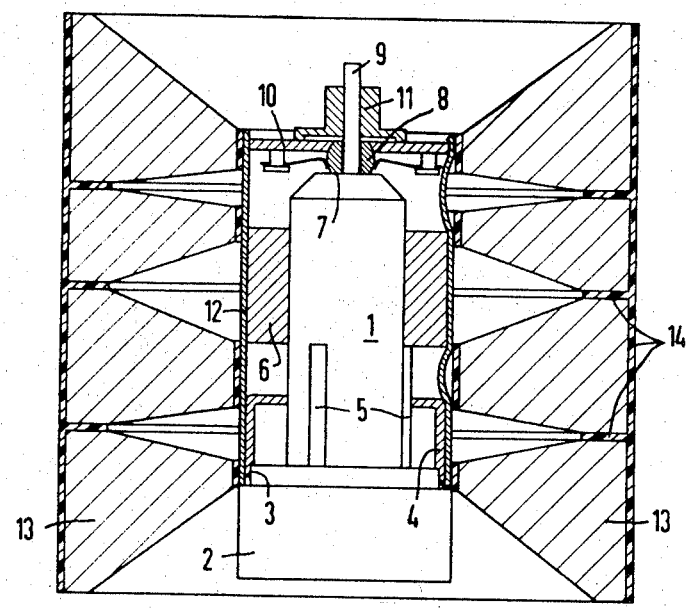

The present invention is a division of our copending application Ser. No. 562,755, filed July 5, 1966, and now U.S. Pat. No. 3,413,715, and relates to apparatus for producing the stator of a motor. More particularly, the invention relates to apparatus and a method for producing the stator of a DC miniature motor.

The production of DC miniature motors by known apparatus and by known methods is complex and expensive because they involve many and precise operations in order to maintain specific tolerances. Furthermore, the stator of a DC miniature motor is produced by pressure casting, which is expensive. This is especially so for the actual housing, which includes a fixed bearing plate and a removable commutator side bearing plate secured by bolts. The expense is increased by the necessary machining of these parts subsequent to casting in order to properly fit cooperating, adjacent or corresponding parts and to properly mount parts. The stator magnet is affixed to the housing by an adhesive.

The principal object of the present invention is to provide a new and improved apparatus and method for producing the stator of a DC miniature motor. The apparatus and method of the present invention produce the stator of a DC miniature motor at very little expense by reducing the cost of production to a very considerable extent. The apparatus and method of the present invention operate on and utilize non-precision, large tolerance parts such as punched bearing plates and an ordinary aluminum encasing tube, rather than close tolerance, high precision pressure castings, as previously utilized.

In accordance with the present invention, apparatus for producing the stator of a miniature motor comprises an assembly mandrel having an axis, a stem having spaced opposite ends of a centering rim coaxially on one of the ends. A centering ring is coaxially positioned around the stem of the assembly mandrel and supported on the centering rim of the assembly mandrel. A stator magnet of substantially annular configuration is coaxially positioned around the stem of the assembly mandrel. Lateral supports are affixed to the assembly mandrel for supporting the stator magnet on the assembly mandrel in spaced relation from the centering ring. A bearing plate having a bearing mounted therein is coaxially positioned at the end of the stem of the assembly mandrel opposite the end of the centering rim. A positioner is affixed to the assembly mandrel for coaxially positioning the bearing plate at one end of the stem thereof. A substantially tubular housing is coaxially positioned around the centering ring, the stator magnet and the bearing plate and is crimped between and around each of the centering ring, the stator magnet and the bearing plate to hold the centering ring, the stator magnet and the bearing plate in position.

The lateral support comprises a plurality of lateral bars affixed to the stem of the assembly mandrel and extending in directions parallel to the axis of the assembly mandrel from the centering rim thereof. The lateral bars are equiangularly spaced from each other. The positioner comprises a pin extending axially from the end of the stem of the assembly mandrel opposite the end of the centering rim.

The method of the present invention for producing the stator of the miniature motor comprises the steps of axially positioning a centering ring around one end of an assembly mandrel, coaxially positioning a substantially annular stator magnet around the assembly mandrel, supporting the stator magnet on the assembly mandrel in spaced relation from the centering ring, coaxially positioning a bearing plate at the opposite end of the assembly mandrel, coaxially positioning a substantially tubular housing around the assembly ring, the stator magnet and the bearing plate, crimping the housing between and around each of the centering ring, the stator magnet and the bearing plate to hold the centering ring, the stator magnet and the bearing plate in position, and withdrawing the assembly mandrel from the bearing plate, the stator magnet, the centering ring and the housing in an axial direction. The housing preferably comprises aluminum. An additional bearing plate is removably affixed to the centering ring in coaxial relation therewith.

Figure 2:
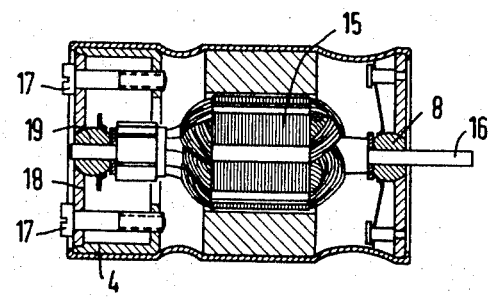

In order that the present invention may be readily carried into effect, it will now be described with reference to the accompanying drawing, wherein:

FIG. 1 is a view, partly in section, of an embodiment of the apparatus of the present invention for producing the stator of a DC miniature motor; and FIG. 2 is a view, partly in section, of an assembled DC miniature motor having a stator produced by the method of the present invention.

In FIG. 1, the housing, casing or encasing tube is unformed on the left, whereas it is illustrated in its formed configuration on the right. An assembly mandrel 1 has a shoulder 2 which is provided with a centering rim 3, the shoulder and its rim being coaxially positioned with said mandrel at one end of said mandrel. In FIG. 1, the shoulder 2 is positioned at the lower end of the mandrel. A centering ring 4 is supported on the centering rim 3 in substantially coaxial relation with and around the stem of the assembly mandrel 1 which extends from the shoulder 2. The central aperture of the centering ring 4 may be larger in diameter than the diameter of the stem of the assembly mandrel 1. The centering ring 4 is utilized to removably secure to the stator the commutator side bearing plate. The commutator side bearing plate must be removable to permit access to the commutator brushes so that such brushes may be serviced.

A plurality of lateral bars 5 such as, for example, three lateral bars, are positioned around the stem of the assembly mandrel 1 at equiangular distances from each other. Thus, the lateral bars 5 are spaced 120° from each other. The lateral bars 5 may be affixed to the assembly mandrel 1 by any suitable means such as, for example, adhesive. The lateral bars 5 extend from the shoulder 2 in directions parallel to the axis of the assembly mandrel 1 and are positioned closely adjacent the peripheral surface of said mandrel. A stator ring magnet 6 of substantially annular configuration is positioned in coaxial relation with and around the stem of the assembly mandrel 1. The central aperture of the magnet 6 is very close in diameter to the diameter of the stem of the assembly mandrel 1, so that the bottom base surface of said magnet abuts the top surfaces of the lateral bars 5. The lateral bars 5 thus maintain the magnet 6 in position on the assembly mandrel 1.

The top surface 7 of the stem of the assembly mandrel 1 is a substantially planar surface. A calotte type bearing 8 is coaxially mounted on a pin or shaft 9 which extends coaxially from the assembly mandrel 1. The bearing 8 is mounted in a bearing plate 10, so that the shaft 9, which corresponds to the motor shaft, is bearing mounted in the bearing plate 10 and extends substantially perpendicularly therefrom. An adjustment or pressure member 11 may be coaxially positioned around the shaft 9 and utilized to position and maintain the bearing plate 10 in perpendicular relation with said shaft.

A housing, casing, or encasing tube 12, which may comprise aluminum, is substantially coaxially positioned around the centering ring 4, the magnet 6 and the bearing plate 10. The centering ring 4, the magnet 6 and the bearing plate 10 do not need to fit exactly into the housing or casing 12, so that roughly finished components may be utilized, rather than precision machined components. The bottom circular base or edge of the housing or casing 12 abuts the shoulder 2 of the assembly mandrel 1 and is supported thereby.

After the assembly of the components in the aforementioned manner, the entire unit, including the components 1 to 12, is placed in a field concentrator 13 of a magnetic forming apparatus. Any suitable magnetic forming apparatus or any other suitable forming apparatus such as, for example, hydrospark or explosion forming apparatus may be utilized. A suitable magnetic forming apparatus may comprise that described in U.S. Pat. No. 2,976,907, issued Mar. 28, 1961 to Harvey et al. The field concentrator 13 may be of any desired known structure such as, for example, various parts 13 separated from each other by insulating rings 14. The housing or casing 12 is formed by the magnetic forming apparatus in the configuration shown on the right of FIG. 1 and in FIG. 2. In such configuration, the housing or casing 12 is crimped between and around the centering ring 4, the magnet 6 and the bearing plate 10 and holds such components firmly in position therein after the assembly mandrel 1 is removed from said housing or casing.

The stator of the miniature DC motor of FIG. 2 is produced by the method of the present invention. After the stator is produced and the assembly mandrel 1 is withdrawn in a downward direction along its axis, a rotor 15 is positioned in said stator and the motor shaft 16 is positioned in the calotte type bearing 8 for rotation therein, in place of the pin 9 which is withdrawn with the assembly mandrel. The commutator side bearing plate 18 which supports a calotte type bearing 19, mounted therein, and the commutator brushes (not shown in the figures) are then removably affixed to the centering ring 4 by any suitable means such as, for example, bolts 17.

The shoulder 2 of the assembly mandrel 1 may be provided with an additional centering rim on its bottom surface similar to its centering rim 3. The additional centering rim may be utilized to position the commutator side bearing plate 18 (FIG. 2). In this case, the shoulder 2 would have to be eliminated or be provided with a very small axial dimension. The centering ring 4 would function as an axial abutment for the commutator side bearing plate 18 and would be held in position by the housing or casing 12. The housing or casing 12 is preferably snugly or tightly fitted around the centering ring 4.

While the invention has been described by means of a specific example and in a specific embodiment, we do not wish to be limited thereto, for obvious modifications will occur to those skilled in the art without departing from the spirit and scope of the invention.

We claim:
1. Apparatus for producing the stator of a miniature motor, comprising an assembly mandrel having an axis, a stem having spaced opposite ends and a centering rim coaxially on one of said ends;

a centering ring coaxially positioned around the lower end of said assembly mandrel and supported on the centering rim of said assembly mandrel, said assembly mandrel being adapted for coaxially positioning a stator magnet of substantially annular configuration;

lateral support means affixed to said assembly mandrel for supporting said stator magnet on said assembly mandrel in spaced relation from said centering ring, the upper end of said assembly mandrel being adapted for coaxially positioning a bearing plate having a bearing mounted therein;

positioning means affixed to said assembly mandrel for coaxially positioning said bearing plate at said end of the stem thereof; and means for crimping a substantially tubular housing coaxially positioned around said centering ring, said stator magnet and said bearing plate to make a crimp between and around each of said centering ring, said stator magnet and said bearing plate to hold said centering ring, said stator magnet and said bearing plate in position.

2. Apparatus as claimed in claim 1, wherein said lateral support means comprises a plurality of lateral bars extending in directions parallel to the axis of the assembly mandrel from the centering rim thereof.

3. Apparatus as claimed in claim 1, wherein said lateral support means comprises a plurality of lateral bars affixed to the stem of said assembly mandrel and extending in directions parallel to the axis of the assembly mandrel from the centering rim thereof.

4. Apparatus as claimed in claim 3, wherein said lateral bars are equiangularly spaced from each other.

5. Apparatus as claimed in claim 1, wherein said positioning means comprises a pin extending coaxially from the end of the stem of said assembly mandrel opposite the end of the centering rim.

6. Apparatus as claimed in claim 4, wherein said positioning means comprises a pin extending coaxially from the end of the stem of said assembly mandrel opposite the end of the centering rim.

References Cited

UNITED STATES PATENTS

| | | | |
|---|---|---|---|
| 2,976,907 | 3/1961 | Harvey et al. | 72—56 |
| 3,172,197 | 3/1965 | Rutledge | 29—596 |
| 3,249,986 | 5/1966 | Adkins | 29—148.4A |
| 3,431,625 | 3/1969 | Schenk | 29—205X |

THOMAS H. EAGER, Primary Examiner

U.S. Cl. X.R.

29—149,5, 421, 596; 72—56